US012208381B2

(12) United States Patent
Förthmann et al.

(10) Patent No.: US 12,208,381 B2

(45) Date of Patent: Jan. 28, 2025

(54) METHOD FOR OPERATING A PISTON-STROKE PIPETTE, PISTON-STROKE PIPETTE, DATA PROCESSING DEVICE AND SYSTEM

(71) Applicant: Eppendorf SE, Hamburg (DE)

(72) Inventors: Benjamin Förthmann, Hamburg (DE); Philipp Cloer, Hamburg (DE); Jens Kleemann, Hamburg (DE); Torsten Krauss, Hamburg (DE)

(73) Assignee: EPPENDORF SE, Hamburg (DE)

(*) Notice: Subject to any disclaimer, the term of this patent is extended or adjusted under 35 U.S.C. 154(b) by 445 days.

(21) Appl. No.: 17/151,073

(22) Filed: Jan. 15, 2021

(65) Prior Publication Data

US 2021/0252498 A1 Aug. 19, 2021

(51) Int. Cl.
*B01L 3/02* (2006.01)

(52) U.S. Cl.
CPC ........... *B01L 3/0237* (2013.01); *B01L 3/0217* (2013.01); *B01L 2200/143* (2013.01); *B01L 2300/023* (2013.01); *B01L 2300/024* (2013.01)

(58) Field of Classification Search
CPC .... B01L 3/02; B01L 3/0237; B01L 2300/024; B01L 2200/143; B01L 2300/023
USPC .......................................................... 73/846
See application file for complete search history.

(56) References Cited

U.S. PATENT DOCUMENTS 4,593,728 A * 6/1986 Whitehead ............ G01N 21/76 422/561
5,055,263 A * 10/1991 Meltzer ............. G01N 35/1072 422/561
5,104,621 A * 4/1992 Pfost ................... G01N 21/253 422/65
5,159,842 A 11/1992 Richard
6,778,917 B1 * 8/2004 Jansen ................. B01L 3/0227 702/65
7,434,484 B2 * 10/2008 Belgardt ............... B01L 3/0279 73/864.14
10,625,254 B2 * 4/2020 Berberich .......... G01N 35/1072
2004/0094638 A1 * 5/2004 Cronenberg ........... G01N 35/10 239/436

(Continued)

FOREIGN PATENT DOCUMENTS

CN 208711744 U 4/2019
EP 1878500 A1 * 1/2008 ............ B01L 3/0227

(Continued)

OTHER PUBLICATIONS

Eppendorf ( "How to Stop Dripping When Pipetting Volatile Liquids": https://handling-solutions.eppendorf.com/liquid-handling/pipetting-facts/pipetting-of-challenging-liquids/detailview/news/how-to-stop-dripping-when-pipetting-volatile-liquids/ "Eppendorf"). (Year: 2019).*

(Continued)

*Primary Examiner* — Peter J. Macchiarolo
*Assistant Examiner* — Monica S Young
(74) *Attorney, Agent, or Firm* — Todd Lorenz

(57) ABSTRACT

The invention relates to a method, a computer program and a system for operating a hand-held, computer-controlled piston-stroke pipette as well as a corresponding piston-stroke pipette as well a data processing device cooperating with that, wherein a precise pipetting of liquid with a vapor pressure higher than that of water is rendered possible by means of a sequence of prewettings of the pipette tip.

13 Claims, 4 Drawing Sheets

(56) References Cited

U.S. PATENT DOCUMENTS

Figure 1:
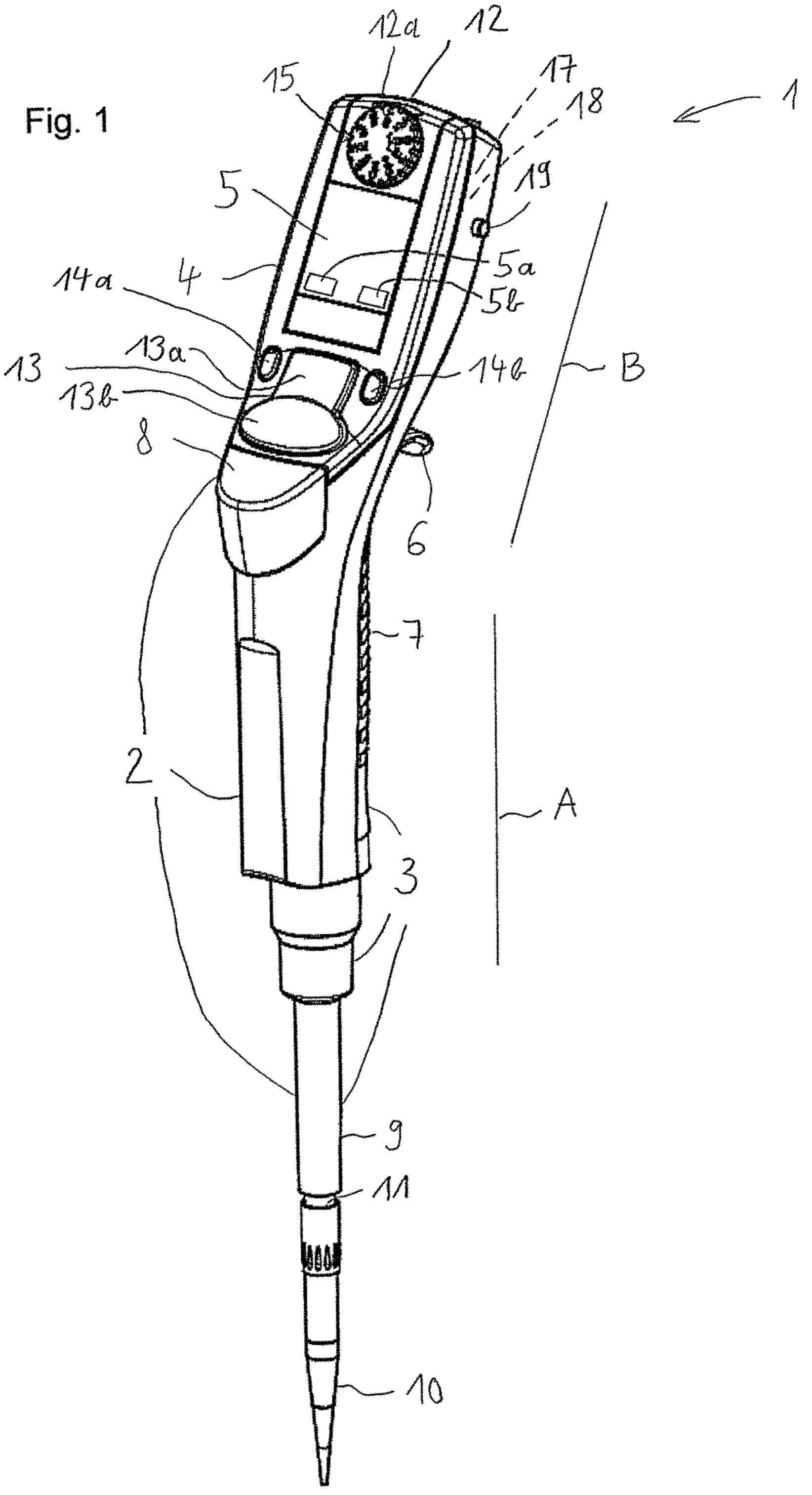

2005/0155438 A1* 7/2005 Belgardt ............... B01L 3/0217 73/864.01
2007/0203457 A1* 8/2007 Kohn ..................... G01N 31/18 604/189
2007/0241130 A1 10/2007 Curtis et al.
2007/0276546 A1* 11/2007 Molitor ................. B01L 3/0227 700/282
2008/0011042 A1* 1/2008 Molitor ................. G01F 11/029 73/1.74
2008/0034898 A1* 2/2008 Molitor .............. G01N 35/1016 222/14
2009/0000350 A1* 1/2009 Magnussen ........... B01L 3/0237 73/864.18
2009/0139351 A1* 6/2009 Reichmuth ........... B01L 3/0286 73/864.11
2011/0088493 A1* 4/2011 Blumentritt ........... B01L 3/0234 422/516
2011/0181272 A1* 7/2011 Andres ................. B01L 3/0279 324/207.2
2013/0047751 A1* 2/2013 Voss ................... G01N 35/1011 73/864.01
2013/0136672 A1* 5/2013 Blumentritt ............. G01F 23/02 422/524
2013/0239667 A1* 9/2013 Lohn ..................... B01L 3/0217 73/864.16
2013/0288382 A1* 10/2013 Andres ................... B01L 3/021 436/180
2013/0319139 A1* 12/2013 Belgardt ............... B01L 3/0234 73/864.13
2013/0336852 A1* 12/2013 Rethwisch .............. B01L 9/543 422/564
2014/0308750 A1* 10/2014 Reichmuth ............. B01L 3/021 436/180
2016/0082430 A1 3/2016 Izumo
2016/0177244 A1* 6/2016 Conway ................. C12M 41/48 435/303.1
2019/0107548 A1* 4/2019 Bohnsack ............ G06Q 10/087
2019/0151840 A1* 5/2019 Berberich .......... G01N 35/1072
2019/0358626 A1 11/2019 Romer et al.
2020/0023350 A1* 1/2020 Göcke ................... B01L 3/0262

FOREIGN PATENT DOCUMENTS

EP 4082665 A1 * 11/2022
KR 20180048456 A * 5/2018
WO WO-2021136932 A1 * 7/2021 ......... G01N 35/0092
WO WO-2022157364 A1 * 7/2022

OTHER PUBLICATIONS

Carle et al., “Best Practices for the Use of Micropipets”, American Laboratory, pp. 1-4, Jun. 2014.
Eppendorf: “Eppendorf Xplorer and Xplorer plus. Operating manual”, pp. 1-96, 16, Feb. 2016 (Feb. 16, 2016).
Eppendorf: “Eppendorf Xplorer / Eppendorf Xplorer plus Adjustment”, pp. 1-26, Jan. 1, 2015 (Jan. 1, 2015).
Kornelia Ewald and Eppendorf AG, “Liquid handling No. 1: Using liquid handling systems in the laboratory”, Applications, Note 10, pp. 1-9, Jan. 2006.
Ewald et al., “Influence of physical parameters on the dispensed vol. of air-cushion pipette”, Eppendorf AG Userguide, No. 21, pp. 1-4, Jun./Jul. 2015.
Izumo et al. “Use of a micropipette”, the 82nd Japan Society for Analytical Chemistry Organic Microanalysis Research Roundtable/ 98th Society of Instrument and Control Engineers Mechanics Measurement Subcommittee Joint Symposium, 32nd Presentation Material, Japan, May 28, 2015.

* cited by examiner

METHOD FOR OPERATING A PISTON-STROKE PIPETTE, PISTON-STROKE PIPETTE, DATA PROCESSING DEVICE AND SYSTEM

The invention relates to a method, a computer program and a system for operating a hand-held, computer-controlled piston-stroke pipette as well as a corresponding piston-stroke pipette and a data processing device cooperating with that piston-stroke pipette.

Such hand-held piston-stroke pipettes are generally used in medical, biological, bio-chemical, chemical and other laboratories.

In the laboratory, they serve for the transport and the transfer of fluid samples of small volumes, in particular for the precise dosage of the samples. With piston-stroke pipettes, e.g. fluid samples are aspirated into pipette tips using a partial vacuum, are stored there, and are released from them at the target position. An electrically operated hand-held piston-stroke pipette can often be controlled by at least one pipetting program in order to execute at least one type of pipetting operation automatically.

Pipetting apparatuses, in the general sense, include e.g. hand-held pipettes and dispensers. Hand-held pipettes are designed for the single-handed use by human users. There are also automated laboratory machines with robotized arms, whose gripping tools emulate the activities of a human hand operating a hand-held pipette and which are configured for handling and operating a hand-held pipette.

A pipette is understood as a device, in which a sample that is to be pipetted can be aspirated with the help of a moving device, which is allocated to the device and which in particular can comprise a piston, into a pipetting container connected to the pipette. In the case of a piston-stroke pipette, also termed as "air cushion pipette", the piston is allocated to the device. In-between the pipetted sample, located in the pipette tip, and the piston end, there is an air cushion that is expanded when the sample is taken up into the pipette tip, by which the sample is aspirated into the pipette tip by means of a partial vacuum. A dispenser is a device in which a volume to be pipetted can be aspirated by means of a moving device, which can comprise in particular a piston, into a pipetting container connected to the dispenser, in which the moving device is at least partially allocated to the pipetting container by e.g. arranging the piston in the pipetting container. In the case of a dispenser, the piston end is located in close proximity of the sample to be pipetted or in contact with it, which is why the dispenser is also termed a direct displacement pipette.

In a pipetting apparatus, the amount of sample released in a single actuation can correspond to the amount of sample aspirated into the device. It can also be provided that an amount of sample corresponding to several amount of sample to be released is released again gradually. Additionally, a distinction is made between single-channel pipetting apparatuses and multi-channel pipetting apparatuses, whereby single-channel pipetting apparatuses comprise only a single release-/uptake channel a multi-channel pipetting apparatuses comprise several release-/uptake channels, which in particular allow for the parallel release or uptake of several samples. Pipetting apparatuses can in particular be hand-operated, i.e. imply a user-generated driving of the moving device, and/or can in particular be operated electronically. Also in the case of the hand-operation of the moving device, the a pipetting apparatus can be an electric pipetting apparatus, by e.g. electrically setting the current release volume or at least one other operating parameter. The pipetting apparatuses described in the framework of the present invention are hand-held computer-controlled piston-stroke pipettes with an electrical piston drive, also termed as hand-held, electronic pipette.

One example for a hand-held, electronic pipette at the state of the art is the Eppendorf Xplorer® and Xplorer® plus of the Eppendorf AG, Germany, Hamburg; examples for hand-held, electronic dispensers are the Multipette® E3 and Multipette® E3x of the Eppendorf AG, Germany, Hamburg.

Electrical pipetting apparatuses provide many advantages as compared to not-electrical pipetting apparatuses, as a plurality of functions can be implemented easily. In particular, the execution of certain, program-controlled pipetting operations in electric pipettes can be simplified by automating or partially automating them. Typical operating parameters for controlling such pipetting operations by means of corresponding pipetting programs relate to the volume at the aspiration or release of liquid, their sequence and repetitions, and if applicable their temporal parameters at the temporal distribution of these operations. An electric pipetting apparatus can be designed to operate in one operating mode or in several operating modes. An operating mode can provide that a set of one or several operating parameters of the pipetting apparatus that influence on or control a pipetting operation of the pipetting apparatus is automatically queried, set, and/or applied.

In practice, piston-stroke pipettes are often used for pipetting aqueous samples, in which water forms the basis of the fluid sample. After the aspiration of the aqueous liquid into the pipette, there is a substantially constant air pressure in the air space (the area termed "air cushion") between the inside of the pipette tip and the piston end. Alterations of the air pressure can be the result of changes of the temperature of the liquid as the vapor pressure is temperature-dependent. In the following, if not stated differently, a condition at room temperature is assumed. In this case, the vapor pressure of water and by this of the pipetted sample is substantially constant also immediately after the aspiration of the aqueous sample into the pipette tip. The vapor pressure is the pressure that is formed when, in a closed system, vapor is in thermodynamic equilibrium with the corresponding fluid phase.

Contrary to aqueous samples, liquids with a higher vapor pressure pose the problem that the sample drips off after the initial aspiration into the pipette tip. This is due to the fact that with these liquids the air space mentioned above is not yet in thermodynamic equilibrium with the aspirated liquid after the initial aspiration. Instead, the pressure increases after the initial aspiration for a period of time until the thermodynamic equilibrium is reached only at a significantly higher vapor pressure than with water, which leads to the dripping of the sample.

In the experiments on which the invention is based, liquids with a higher vapor pressure were divided into three classes, which are distinguished by their vapor pressure. The solvent ethanol is in the first class, methanol in the second class, and acetone in the third class. In all three classes there are liquids that exhibit a substantially higher vapor pressure than water, with acetone having the highest vapor pressure.

The said liquids with a higher vapor pressure are harder to pipette than water because of the aforementioned problems of the dripping.

The invention is based on the task to specify a method, a system, and a computer program resp. a piston-stroke pipette, with which also liquids with a higher vapor pressure than water can be pipetted comfortably and precisely.

The invention solves this task with the method according to original claim 1, the hand-held piston-stroke pipette according to original claim 12, the system according to original claim 15, the computer program according to original claim 16 and the data processing device according to original claim 17. Preferred embodiments are in particular subject matter of the original subclaims.

The method according to the present invention is a method for operating a hand-held, computer-controlled piston-stroke pipette, that serves for the computer-controlled execution of a pipetting operation with the fluid sample, in particular for the automated prewetting of the inside of a pipette tip that is arranged at the nose cone of the piston-stroke pipette, comprising the computer-controlled steps: •Providing a function n_vb(x) that specifies a number n_vb of one or several prewetting steps as a function of a variable x characterizing the pipetting operation, •Acquiring of the at least one parameter value of the variable x characterizing the pipetting operation;•Determining the number n_vb of prewetting step associated to the variable x by means of the function n_vb(x);•Execution of a prewetting step or of a sequence of a number n_vb of several prewetting steps, in which n_vb>0 and in which the prewetting step comprises that the piston-stroke pipette executes an electrically driven piston movement in order to take up a sample volume into the pipette tip and that subsequently an inverse piston movement is executed in order to release the sample volume contained in the pipette tip from the pipette tip at least partially or completely.

The function n_vb(x) assigns a value n_vb to the values of a one- or multidimensional variable x. The codomain of the function n_vb(x) comprises at least two distinct values.

The variable x can be one-dimensional, i.e. comprise only one parameter, e.g. a volume. The variable x can be multi-dimensional, i.e. comprise several parameters, e.g. the type of liquid and volume. By choosing different values n_vb in function of the variable x, an individual number of prewetting steps can be selected for different pipetting conditions. In this way, it is in particular possible to minimize the time expenditure resulting from the prewetting steps, required for being able to precisely execute the desired pipetting operations of a liquid exhibiting a higher vapor pressure than water without dripping. For a measure of a temporal optimization one can, for example, simply refer to the fact that the number of prewetting steps should prevent a dripping of the pipette tip filled with the liquid for a period of time Δt measured from the complete uptake of the sample into the pipette tip.

The invention is based on the observation that the time until the thermodynamic equilibrium in the space between the liquid and the piston, which can be adjusted by the prewetting steps, is reached for a liquid taken up into the pipette tip can depend on various factors. When considering these easy-to-determine factors, resp. parameters, one obtains an optimal pipetting strategy for the respective liquid sample.

When prewetting a pipette tip, the liquid interface formed in the loaded pipette tip between the liquid and the volume of air above the liquid is increased. After aspirating the liquid into the pipette tip, this liquid interface is first formed by the meniscus, the surface of which, when the pipette is held vertically, will have a slightly larger area than the circular cross-section formed by the pipette tip at the height of the meniscus through the conical or cylindrical vessel interior of the pipette tip. When the liquid from the pipette tip is almost completely released, a liquid film remains at the inside of the pipette tip, which—in first approximation—corresponds to the maximally wet inner surface of the pipette tip. With this wetting surface being considerably larger than the meniscus, also the amount of liquid evaporating per time—until the liquid film is evaporated entirely—is increased correspondingly. The vapor pressure required for an equilibrium in the volume of air can therefore be reached faster. An equilibrium between the gravitational force and the partial vacuum present in the space of air is reached immediately after the execution of the required prewetting steps, so that a dripping can be prevented at least for the considered period of time Δt. Corresponding measurements that can be executed easily and reproducibly for all liquids, pipette tips and type of devices of piston-stroke pipettes are explained in connection with the figures.

The function n_vb(x) preferentially optimizes a number n_vb of one or several prewetting steps as a function of a variable x characterizing the pipetting operation in such a way that the air pressure achieved by means of the prewetting in the air cushion between fluid sample and immobile piston of the piston-stroke pipette is sufficiently constant for preventing the dripping of the sample to be aspirated into the pipette tip during the pipetting operation. The air pressure is assumed to be sufficiently constant in particular if a dripping is prevented under standard conditions for a period of time Δt. Suitable periods of time for the manual pipetting are e.g., each preferentially, Δt=10 seconds, Δt=15 s, Δt=20 s, Δt=25 s, Δt=30 s, Δt=40 s, Δt=50 s, Δt=60 s. The standard conditions comprise a situation at room temperature, from the moment of aspirating the volume V of the sample to be pipetted, the piston-stroke pipette shall be supported free of vibration and stationary, e.g. by placing the piston-stroke pipette into a pipette rack with the pipette tip being stored in particular vertically, thus parallel to the gravitational force. The time from the conclusion of the aspiration until the first liquid drop drips off the lower end of the pipette tip is determined.

The type of liquid, i.e. in particular the vapor pressure of the liquid reported under standard conditions, has been proven to be an important factor in the determination of the number n_vb of prewettings. For ethanol, this vapor pressure is 58 hPa, for methanol 129 hPa and for acetone 246 hPa. The type of liquid can be described by a parameter ID_LM that chemically identifies the main liquid component of the fluid sample that is to be pipetted.

In the case of mixtures of liquids with known vapor pressures, the mixing ratio can be consulted as factor in the determination of the number n_vb of prewettings. When using a liquid that does not tend to drip in particular because of a low vapor pressure, e.g. water, as a diluent for a liquid with a higher vapor pressure, also the dilution can be used as a factor in the determination of the number n_vb of prewettings, in particular by specifying the amount, the volume- or weight fraction of the diluent contained in the fluid sample to be pipetted, which can be identified by a parameter ID_VM.

Another important factor in determining the number n_vb of prewettings was the fill level of a pipette tip relative to the nominal volume (nominal maximum fill) of the pipette tip, which can be considered e.g. at 100%, 50 and 10% of the nominal volume. Similarly, the volume V taken up into the pipette tip during a pipetting operation is an important factor in determining the number n_vb of prewettings.

The type of device of the piston-stroke pipette has been proven to be another important factor in the determination of the number n_vb of prewettings. This can be explained by, among other things, the air space between the outlet of a nose cone and the piston of the piston-stroke pipette varying from device to device. The said air space contributes significantly to the total air space between the liquid and the end of the piston, in which, for the establishment of an equilibrium, a vapor pressure must be reached. Therefore, a parameter ID_GT identifying the type of device of the piston pipette performing the pipetting operation can also be used as factor resp. parameter. An equivalent to such a parameter is, in the case of a set of known piston-stroke pipettes, in which a specific type of device exhibits a specific nominal volume (e.g. the set of pipettes: 10 µl-pipette, 100 µl-pipette, 300 µl-pipette, 1000 µl-pipette, 1200 µl-pipette, 5 ml-pipette, 10 ml-pipette), the use of a parameter V_nom comprising the nominal volume of the pipette and thus uniquely identifying the pipette.

Also the type of pipette tip is a parameter, that can be used for the determination of the number n_vb of prewettings. On the one hand, the wettability can vary with the material of the pipette tip. On the other hand, the pipette tips exhibit different inner surface area that determine the establishment of the vapor pressure, as well as varying nominal volumes and air space volumes above the liquid. Therefore, also a parameter ID_ST specifying the pipette tip employed in the pipetting operation can be used as a factor resp. parameter.

Another parameter that can be used for determining the number n_vb of prewettings can be the speed v_K, with which the piston of the piston-stroke pipette in the execution of the at least one prewetting step. However, it is particularly preferable in this context to us the maximum speed that can be set for a particular piston-stroke pipette, since this directly determines the to-be-minimized period of time required for the execution of at least one prewetting step.

Since the vapor pressure, and with it also the number n_vb of prewettings, depends also on the ambient parameters p_u, it can also be consulted as a factor. A relevant parameter for the determination of the number n_vb of prewettings is the temperature T of the surroundings of the piston-stroke pipette or of the fluid sample to be pipetted in the pipetting operation at the moment of the pipetting operation, and/or the air pressure or vapor pressure P of the surroundings of the piston-stroke pipette at the moment of the pipetting operation.

The function n_vb(x) assigns a value n_vb to the values of a one- or multidimensional variable x. The codomain of the function n_vb(x) comprises at least two distinct values. A function n_vb(x) that, in practice, is valid for a multitude of different pipetting situations comprises a plurality of different assignments of the value n_vb to the components resp. parameters of a multidimensional variable x, the codomain then comprises a plurality of different values of the number n_vb. The assignments can be available in the form of a data assignment table, which can represent the function n_vb(x). The function can comprise a data assignment table, in order to assign a number n_vb to a variable x.

Preferentially, the variable x comprises the following combinations of parameters:

a parameter ID_LM chemically identifying the main liquid component of the liquid to be pipetted.

a parameter ID_GT or V_nom identifying the type of device of the piston-stroke pipette, at least one or two different fill levels FV_nom, or exactly two or exactly three different fill levels FV_nom of the pipette tip matching the piston-stroke pipette, in particular fill levels FV_nom at 10%, 50% and/or 100% of the nominal volume.

In practice, this combination x=(ID_LM; ID_GT or V_nom; FV_nom) has been proven to be suitable for specifying a suitable number n_vb of prewettings for almost all pipetting situations. In particular, for liquid sample volumes to be pipetted or to be taken u into the pipette tip which do not correspond to the values FV_nom, the appropriate number can be specified from an algorithm or an approximate equation which can be determined from the value pairs (n_vb; FV_nom). A straight line or a combination of two sections of straight lines has been proven to be a suitable approximate equation. This will be explained in the following.

In practice, it has been proven as advantageous to limit the number n_vb of the prewetting step to a maximum number n_max, even if this is technically not mandatory. The number n_max=99, n_max=50; n_max=20; n_max=10 proves to be particularly reasonable. At such value it is possible to work optimally with most liquids, with a focus either on maximizing the drip resistance or on minimizing the period of time spent on prewetting (time optimization). If a sample to be pipetted does not show any dripping under certain parameters x, the function n_vb(x) assigns in practice the value n_vb=0 (zero) to the corresponding parameters x. The invention comprises that the function n_vb(x) contains at least one value n_vb>0 that is assigned to at least one variable, thus combination of parameters x.

Due to the desired time optimization, it also has been proven to be advantageous to use the maximum speed v_K_max of the piston movement. In the experiments that this invention is based upon, the maximum piston speed for piston-stroke pipettes with a nominal volume V_nom=10 µl, 100 µl, 300 µl, 1000 µl was v_K_max=V_nom/1,8 s, for V_nom=1200 µl it is v_K_max=V_nom/2,0 s, for V_nom=5 ml, 10 ml it is v_K_max=5,2 s.

The function n_vb(x) can also comprise partially or completely at least one calculation algorithm or can be represented by it in order to assign a number n_vb to the variable x. Such an algorithmic assignment is particularly suited for determining further values n_vb(x) by interpolation or extrapolation based on known, experimentally determined assignments. As an example, some of the parameters of the variable x can be determined experimentally, and for a selected parameter xi, thus of a component of x, an assignment can be made by means of the algorithm that assigns the desired values n_vb(xi) to a variation of xi. In particular, in the case of an in particular previously determined type of device of a piston-stroke pipette, for an in particular previously determined type of pipette tip and in particular previously determined type of liquid, various value assignments n_vb(xi) can be made via the algorithm, where xi can be in particular the volume V to be pipetted, in particular to be aspirated into the pipette tip, during a planned pipetting operation, In a preferred embodiment, the variable x comprises the parameter value V of the volume of pipetting volume V that is to be aspirated into the pipette during the pipetting operation or is formed by this parameter value V, with the function n_vb(V) in particular in dependence of the solvent of the sample aspirated in the pipetting operation being described as a linear relation between n_vb and V, i.e. n_vb=a*V+b. In this, a and b are real numbers. Here, preferentially the range of volumes V that can be pipetted is divided into two sections, in each of which a characteristic parameter set a, b applies, so that in the first section V1 to V2 of possible volumes the relation n_vb=a1*V+b1 and in the second section V2 to V3 of possible volumes the relation n_vb=a2*V+b2 applies, and in particular the relations a1< >a2 and b1< >b2 hold true. In experiments, this representation results in a sufficiently precise description of the optimal number n_vb of prewettings in function of the pipetting volume V.

The method according to the present invention is in particular a method for the automated prewetting of the inside of a pipette tip that is arranged at the nose cone of the piston-stroke pipette comprising the computer-controlled steps specified in the claim. Since the prewetting secures the execution of a precise pipetting step, the method according to the present invention is in particular a method for the execution of a computer-controlled pipetting operation by means of a hand-held computer-controlled piston-stroke pipette comprising the steps of the method for the automated prewetting according to the present invention and comprising the step of executing the following computer-controlled step subsequent to the execution of the sequence of number n (n>=1) of one or several prewetting steps: •Aspiration of a sample volume V of the fluid sample into the pipette tip and in particular holding that sample volume V of the fluid sample in the pipette tip, in particular for an undetermined period of time or a determined period of time Δt.

The providing of the function n_vb (x) that specifies a number n_vb of one or several prewetting steps as a function of a variable x characterizing the pipetting operation can be implemented in a device-related way in different ways:

Preferentially, an external data processing device is provided that comprises in particular a data interface device, in particular a user interface device (e.g. a touchscreen) and in particular an electronic control device. A piston-stroke pipette can be provided or several piston-stroke pipettes can be provided, whereby each piston-stroke pipette can comprise an electronic control device. The control devices of the external data processing device and of the piston-stroke pipette can each be configured to exchange data among each other via a wired or preferentially a wireless data connection.

The data connection can be in particular a remote data connection that preferentially uses a radio network, in particular WLAN. For this, the external data processing device and the piston-stroke pipette comprise preferentially a radio device for the data exchange, in particular a radio module, e.g. a WLAN adapter.

The control device of the external data processing device is preferentially configured to acquire, by means of the data interface device, in particular the user interface device, at least one or all of the aforementioned parameters of the variable x, in particular one or several of the parameters ID_LM, ID_VM, ID_GT, ID_ST, v_K, p_u, T or P. The data interface device can be configured to acquire parts of or all of the aforementioned parameters via the data connection, in particular the remote data connection, e.g. WLAN, with an additional external data processing device, which can be e.g. a PC, a smartphone or a tablet computer. The control device and/or the data interface device can be configured to acquire parameters, in particular those of the variable x, partially or completely from a data storage, in particular a data storage of the external data processing device.

The user interface device comprises preferentially at least one input instrument, e.g. a keyboard, a computer mouse device, a microphone for voice control, a camera for registering gestures, and/or a touchscreen, via which a user can carry out input at the external data processing device, and comprises preferentially at least one output device, e.g. a screen, speakers, via which the user can receive information from the external data processing device. A touchscreen can serve as a combined input- and output instrument. However, the variable x can also be acquired by the control device of the external data processing device via an additional data connection between the external data processing device and an additional external data processing device, in particular a computer, tablet computer or smartphone.

The control device of the external data processing device resp. the external data processing device and/or the piston-stroke pipette resp. its control device comprise preferentially a data storage, on which the function n_vb(x) is stored or can be stored.

The control device of the external data processing device or the control device of the piston-stroke pipette is configured resp. programmed preferentially to determine the value of the number n_vb of prewetting steps from at least one or all of the aforementioned parameters of the variable x by means of the function n_vb(x). The external data processing device can use in particular a control software—in particular one stored in a data storage—that controls the functions of the external data processing device, in particular the function for acquiring the variable x, the function for determining the value n_vb from the function n_vb(x) and/or the function of the data exchange with a piston-stroke pipette in order to transfer in particular at least one value, preferentially the previously determined value n_vb to the piston-stroke pipette resp. its control device.

In particular if the function n_vb(x) is stored in the piston-stroke pipette and evaluated by the control device of the piston-stroke pipette the external data processing device is not essential for the execution of the invention. It is possible that the control device of the external data processing device is configured resp. programmed to acquire the parameters of the variable x completely or partially by means of the data interface device and to transfer them to the control device of the piston-stroke pipette via the data connection. The control device of the piston-stroke pipette can be configured to use the parameters acquired as explained before of the variable x for determining the value n_vb assigned by the function n_vb(x), whereby in particular the function n_vb(x) can be stored in a data storage of the piston-stroke pipette.

The control device of the external data processing device is configured resp. programmed preferentially to receive a reply signal, in particular reply data, from the control device of the piston-stroke pipette after the transfer of at least the value n_vb or the transfer of parameters of the variable x to the control device of the piston-stroke pipette. By receiving this reply signal, the control device of the external data processing device is configured preferentially to register the successful transfer of the sent parameters and/or to register a transfer error. Information containing the success or failure of the transfer can be output to the user via the user interface device of the external data processing device.

The control device of the piston-stroke pipette is configured resp. programmed preferentially to transfer a reply signal, in particular reply data, to the control device of the external data processing device after registering at least the value n_vb or registering parameters of the variable x from the control device of the external data processing device.

The control device of the at least one piston-stroke pipette preferentially registers the value n_vb via the data connection and stores this value in particular temporarily in a data storage of the piston-stroke pipette. Also, it is preferred that the control device of the at least one piston-stroke pipette acquires further values in addition to the value n_vb via the data connection, in particular the liquid volume V to be pipetted in the desired pipetting operation and/or a speed v_K of the piston speed/speeds to be used in the pipetting operation, and stores these values in particular temporarily in a data storage of the piston-stroke pipette. In this way, all values that are required for the automated execution of a one or multi step pipetting operation can be transferred from the external data processing device onto the piston-stroke pipette, which uses in particular these values in order to execute the said pipetting operation.

The external data processing device is preferentially a hand-held computer. The external data processing device is not a component of the hand-held piston-stroke pipette and is therefore termed "external". It comprises preferentially a casing in which the further components of the external data processing device are contained, in particular: the control device, a data interface device, in particular a user interface device, in particular a screen, in particular a touchscreen, resp. an input device for the user input, a data interface, in particular a radio device for the data exchange, and/or a mains adapter and/or a battery.

The hand-held piston-stroke pipette for the computer-controlled execution of a pipetting operation with a fluid sample according to the present invention comprises: an electronic control device, a piston chamber and a piston that can move therein, an electric piston drive for moving the piston, in particular an electric motor, a nose cone, at which the pipette tip can be attached. The control device is configured to control the piston drive and to execute a pipetting program that comprises the following steps: •Execution of a sequence of a number n_vb of one or several prewetting steps in which a prewetting step in particular comprises that an electrically driven piston-stroke is executed by the piston-stroke pipette in order to take up a sample volume into the pipette tip, and that subsequently an inverse piston movement is executed in order to release the sample volume at least partially or completely from the pipette tip, •subsequent to the at least one prewetting step: Execution of a pipetting operation, comprising the aspiration of a sample volume V of the fluid sample into the pipette tip and in particular holding of that sample volume V of the fluid sample in the pipette tip, in particular for an undetermined period of time or a determined period of time $\Delta t$.

The control device of the hand-held piston-stroke pipette according to the present invention is preferentially configured to receive the value of the pipetting volume V to be aspirated into the pipette tip in the pipetting operation and/or the value n_vb via a data connection from an external data processing device, and that comprises a data storage, in which the value V and/or the value n_vb can be stored.

The piston-stroke pipette can be a single-channel pipette or a multi-channel pipette. Single-channel pipettes comprise only one single release-/uptake channel resp. only one single nose cone, and multi-channel pipettes comprise several release-/uptake channels resp. nose cones that allow for in particular the parallel release or uptake of several samples.

The invention also relates to a system for the automated prewetting of the inside of a pipette tip that is arranged at the nose cone of a hand-held, computer-controlled piston-stroke pipette that serves for the computer-controlled execution of a pipetting operation with a fluid sample, comprising at least one hand-held piston-stroke pipette according to the present invention, an external data processing device that comprises a user interface device (e.g. touchscreen) and an electronic control device, in which the control devices of the external data processing device and of the piston-stroke pipette are configured to exchange data via a data connection, preferentially a remote data connection, e.g. WLAN, in which the control device of the external data processing device is configured to acquire by means of the user interface device a variable x, in particular the parameter value V of the volume of the pipetting volume V that is to be aspirated into the pipette tip during the pipetting operation, a parameter ID_LM that identifies the solvent of the fluid sample to be pipetted, a parameter ID_GT that identifies the type of device of the piston-stroke pipette executing the pipetting operation or V_nom, and/or in particular a parameter ID_ST that identifies the type of pipette tip of the pipette tip used in the pipetting operation, in which in particular the system comprises at least one data storage that comprises the function n_vb(x) by means of which the control device determines the value of the number n_vb(x) of the prewetting steps from the at least one or all of the said parameters of the variable x and the system is configured to determine the value of the number n_vb of the prewetting step from the at least one or all of the said parameters of the variable x by means of the function n_vb(x), in which the control device of the at least one piston-stroke pipette is configured to acquire the number n_vb of the prewetting steps, in particular via a data connection with the external data processing device. The piston-stroke pipette is preferentially a network-independently powered device and comprises in particular a battery as power source for the electric functions of the piston-stroke pipette.

The invention also relates to a data processing device that is in particular the aforementioned external data processing device, comprising:

a data interface device, in particular a user interface device, e.g. a touchscreen, and an electronic control device, in which the control device of the data processing device is configured, in particular programmed—thus it comprises a suitable computer program, in particular the computer program according to the present invention—to exchange via a data connection, e.g. a remote data connection, e.g. WLAN, data with the control device of a piston-stroke pipette, in particular the piston-stroke pipette according to the present invention that serves for the computer-controlled execution of a pipetting operation with a fluid sample, in which the control device of the data processing device is configured, in particular programmed, to acquire a variable x by means of the data interface device, in particular the parameter value V of the volume of the pipetting volume V to be aspirated into the pipette tip during the pipetting operation, a parameter ID_LM that identifies the solvent of the fluid sample to be pipetted, a parameter ID_GT that identifies the type of device of the piston-stroke pipette that performs the pipetting operation, and/or a parameter ID_ST that identifies the type of pipette tip that is used in the pipetting operation, and in which the control device of the data processing device is configured, in particular programmed, to determine the value of the number n_vb of the prewetting steps from the at least one or all of the said parameters of the variable x and to provide it for the data processing of the control device of the piston-stroke pipette and/or to transfer it via the data connection to the piston-stroke pipette. The data processing device, in particular its control device, can comprise a data storage that comprises the function n_vb(x), by means of which the control device determines the value of the number n_vb of prewetting steps from the at least one or all of the said parameters of the variable x. However, this data storage can also be arranged on an additional data processing device outside of the data processing device and the parameters of the variable x resp. the value n_vb determined from them can be exchanged via the data interface device, which can realize e.g. a wireless or a wired data connection, between the control device of the data processing device and the additional data processing device.

The invention also relates to a computer program, in particular a computer program for operating a hand-held, computer-controlled piston-stroke pipette, that serves for the computer-controlled execution of a pipetting operation with the fluid sample, in particular for the automated prewetting of the inside of a pipette tip that is arranged at the nose cone of the piston-stroke pipette, in which the computer program comprises commands, that, while the central processing unit of at least one electric control device or of an external data processing apparatus of the piston-stroke pipette executes the computer program, prompt this central processing unit to execute the following step, •Acquiring of the at least one parameter value of the variable x characterizing the pipetting operation;•Access on a data storage, in which a function n_vb(x) that specifies a number n_vb of one or several prewetting steps as a function of a variable x characterizing the pipetting operation is stored, •Determining the number n_vb of prewetting step associated to the variable x by means of the function n_vb(x); Providing at least the value n_vb so that this value can be used by the control device of a piston-stroke pipette in order to execute at least one prewetting step of the number n_vb; optionally: •Execution of a prewetting step or of a sequence of a number n_vb of several prewetting steps, in which a prewetting step comprises that an electrically driven piston movement is executed by the piston-stroke pipette in order to take up a sample volume into the pipette tip and that subsequently an inverse piston movement is executed in order to release the sample volume at least partially or completely from the pipette tip;•optionally: subsequent to the at least one prewetting step: Execution of a pipetting operation, comprising the aspiration of a sample vole V of the fluid sample into the pipette tip and in particular holding of that sample volume V of the fluid sample in the pipette tip, in particular for an undetermined period of time or for a determined period of time Δt of in particular 30 seconds.

The piston-stroke pipette or an external data processing device comprise preferentially a storage device. This data storage device comprises preferentially a data storage, in particular a hardware data storage, in particular non-volatile data storage, in particular an EPROM or a Flash memory. It can also comprise a volatile data storage.

The hand-held piston-stroke pipette according to the present invention, in particular its control device, is designed preferentially to use at least one operating parameter that serves for the control of a pipetting operation for the execution of at least one pipetting operation.

The electric control device of the piston-stroke pipette resp. of an external data processing device, also termed in an abbreviated form as controlling device or control device, comprises preferentially a data processing device that comprises in particular at least one central processing unit (CPU). The control device comprises preferentially a micro-controller. The control device comprises preferentially at least one storage device resp. a data storage for the storage of data, in particular of operating parameters and/or of one or several computer programs resp. computer program codes.

The control device comprises preferentially at least one control software resp. one control program, which uses this at least one operating parameter in order to execute automatically at least one function of the pipetting operation or a part of the pipetting operation or the pipetting operation, in particular in order to execute at least one prewetting step, in particular using the parameter n_vb selected for the pipetting operation, which thus constitutes an operating parameter. The control software resp. the control program is executed in particular by the data processing device of the control device, in particular by a CPU of the data processing device. The control software resp. the control program is stored in particular in a storage device of the device. This storage device is preferentially a non-volatile storage.

The hand-held piston-stroke pipette according to the present invention is configured preferentially for being used for the execution of at least one pipetting operation according to at least one operating mode (ID_OM) of the pipetting apparatus. In an operating mode, preferentially one operating parameter (set of operating parameters) is provided that serves for the execution of a pipetting operation that is executed in that operating mode.

Typically, a pipetting operation provides that, according to a pipetting program, a determined amount of sample is taken up from an initial container into a pipetting container, in particular a pipette tip, connected to the piston-stroke pipette and/or released in a target container, in particular released in a dosed way. A pipetting operation can be controlled preferentially by at least one, preferentially several, or a set of operating parameters, with which the said pipetting operation, or a function resp. a component of that pipetting operation can be influences in the desired manner.

Operating parameters for controlling a pipetting operation related to resp. quantify preferentially the volume to be pipetted in the step of aspirating the sample into a pipetting container connected to the piston-stroke pipette or in the step of releasing the sample from said pipetting container, if applicable the sequence and repetitions of these steps, and if applicable temporal parameters in the temporal distribution of these operations, in particular also the temporal variation of such operations, in particular the speed and/or acceleration of the aspiration or the release of the sample.

These operating parameter are selected and/or input preferentially at least partially and preferentially completely by the user, in particular via the at least one control element of the user interface device of a piston-stroke pipette or of an external data processing device.

The pipetting operation is uniquely defined preferentially by the set of operating parameters. This set of operating parameters is selected and/or input preferentially at least partially and preferentially completely by the user, in particular via the operational control device of the piston-stroke pipette or of the external data processing device.

Yet, it is possible that a pipetting operation is not uniquely defined by the set of operating parameters. It is also possible and preferred that at least one operating parameter is not defined by the user but indicated e.g. by the pipetting apparatus by storing it there e.g. as known. The pipetting apparatus can be designed to automatically determine at least one operating parameter.

The piston-stroke pipette or an external data processing device can comprise a sensor device comprise e.g. a sensor for acquiring an ambient parameter, in particular the temperature, the humidity or the pressure, the motor current used for the piston drive of the piston-stroke pipette. The motor current can be used in particular for the determination of the viscosity of the liquid that is being pipetted, and by this for the identification of the liquid resp. for the determination of ID_LM. The sensor device can also be designed for the execution of a measurement, with which the type of the pipetting container connected to the pipetting apparatus, in particular the maximum fill volume of the pipetting container, in particular of a pipette tip, can be determined. The piston-stroke pipette or an external data processing device can be designed to automatically determine at least one operating parameter, in particular a parameter used for the determination of the variable x in function of the measurement value of the sensor device. By this, the optimization of the pipetting parameters required for a precise pipetting can be further improved.

In the following, the operating modes and the operating parameters preferentially assigned to them are described, which are each preferentially provided by the pipetting apparatus:

Preferentially, an operating parameter is provided, with which a volume to be pipetted is defined. An operating parameter can be provided, with which an aspiration volume that is to be aspirated during the aspiration step is defined and/or an operating parameter can be provided, with which a release volume that is to be released during a release step is defined.

Preferentially, at least one operating parameter is provided, with which the number of directly successive or indirectly successive pipetting volumes is determined, preferentially at least one operating parameter, with which the number of aspiration steps and/or release steps and preferentially also the respectively assigned pipetting volumes, the respectively assigned pipetting velocities and/or accelerations, and/or the respectively assigned time intervals between the steps are determined.

Preferentially, one operating mode relates to the "dispensing" (DIS) of a sample. Associated operating parameters are, each preferentially: the volume of the single sample, relating to the pipetting volume during one of multiple release steps; the number of the release steps; the speed during the uptake of the sample(s); the speed during the release of the sample(s). The dispensing function is suitable in particular for the rapid filling of a microwell plate with a liquid reagent and can be used e.g. for the execution of an ELISA.

Preferentially, one operating mode relates to the "automated dispensing" (ADS) of a sample. Associated operating parameters are, each preferentially: the volume of the single sample, relating to the pipetting volume during one of multiple release steps; the number of the release steps; the duration of the time interval, according to which the release steps are executed automatically with constant time lags between one after the other—the time interval can determine these time lags or e.g. the delay between the end and the beginning of successive release steps; the speed during the uptake of the sample(s); the speed during the release of the sample(s). This dispensing function is suitable in a more comfortable way for the filling of a microwell plate, as the user does not need to repeatedly trigger a release step by an actuation, e.g. by pressing a button, but the release is carried out in a time controlled way after starting the automated dispensing. In the same way as all other operating programs of an operating mode also the automated dispensing can be carried out under the condition that the corresponding program is carried out at least during an uninterrupted actuation of a control element, e.g. while a button is uninterruptedly held down. This is of advantage for example in long series of dispensing operations or reaction, in which it is required to precisely observe a time window. The automated dispensing function is suitable in a more comfortable way for the filling of a microwell plate, as, in this scenario, the user does not need to trigger an individual release step by an actuation, but the release is carried out automatically, which can be used e.g. for the execution of an ELISA.

Preferentially, one operating mode relates to the "pipetting" (Pip) of a sample. Associated operating parameters are, each preferentially: the volume of the sample to be pipetted; the speed during the uptake of the sample; the speed during the release of the sample.

Preferentially, one operating mode relates to the "pipetting followed by mixing" (P/Mix) of a sample. Associated operating parameter are, each preferentially: the volume of the sample to be aspirated and/or to be released; the mixing volume; the number of mixing cycles; the speed during the uptake of the sample; the speed during the release of the sample. The function "pipetting followed by mixing" is recommended for the pipetting of very small volumes, for example. If a dosing volume<10 μl is selected, it is recommended to flush it into the corresponding reaction liquid. This can be achieved by automatically starting a mixing movement after the release of the liquid. The mixing volume as well as the mixing cycles are defined earlier. An application of this operating mode is e.g. the release of a liquid that is harder to dose than water because of its physical properties, with its residues in the pipetting container, in particular the pipette tip, being flushed using the present liquid from the pipetting container, resp. the pipette tip. Another application could be the immediate mixing of the released liquid with the present liquid. This operating mode is of advantage e.g. when DNA is added to a PCR mixing solution.

Preferentially, one operating mode relates to the "repeated uptake" of a sample, also referred to as "inverted dispensing" or as "ASP" for aspirating. Associated operating parameters are, each preferentially: the volume sample(s) to be aspirated; the number of samples; the speed during the uptake; the speed during the release. The function serves for the repeated uptake of an amount of liquid and the release of the total amount. In this, the repeated filling of the pipetting container in one operation is not provided. The speed is the same for all samples. During the execution, preferentially the following occurs: Departing from the home position, the pipetting apparatus takes up a partial volume by actuation of the first kind of the operational control device. After the last partial volume has been taken up, the pipetting apparatus preferentially issues a warning that has to be confirmed by the user preferentially by the actuation of the second kind of operational control device. At the subsequent actuation of the second kind of operational control device, the total volume will be released again. For the actuation of the first or second kind, the operational control device comprises preferentially at least two control buttons, one for the input of a control signal of the "first kind" to the control device, and one for the input of a control signal of the "second kind" to the control device. The operational control device can comprise in particular a rocker switch that can pivot in particular around an axis perpendicular to the long axis of the pipetting apparatus between a first signal trigger position ("rocker switch up") for the actuation of the first kind and a second signal trigger position ("rocker switch down") for the actuation of the second kind.

Preferentially, one operating mode relates to the "diluting" (Dil) of a sample, also referred to as "dilution". Associated operating parameters are, each preferentially: the sample volume; the air bubble volume; the volume of the diluent; the speed of the uptake; the speed of the release. The maximum volume of the diluent=nominal volume−(sample+air bubble). This function serves for the uptake of a sample and of a diluent separated by an air bubble and for the release of the total amount. The speed is the same for all partial volumes. During the execution, preferentially the following occurs: Departing from the home position the pipetting apparatus takes up first the volume of the diluent, then an air bubble and finally the sample. Each uptake is triggered preferentially separately by an actuation of the operational control device of the first kind. Subsequently, the total amount is released entirely.

Preferentially, one operating mode relates to the "sequential dispensing" (SeqD) of samples. Associated operating parameters are, each preferentially: the number of samples (preferentially up to a maximum number Nmax of preferentially 5<=Nmax<=15, preferentially Nmax=10); individual volumes of the individual samples; speed of the uptake; speed of the release. This function serves for the sequential dispensing of Nmax freely selectable volumes, preferentially without multiple filling of the pipetting container. The speed is the same for all samples. The number of samples is preferentially the leading parameter for the input of the individual volumes. The pipette has to check every time preferentially when entering the volumes, that the maximum volumes of the pipetting apparatuses is not exceeded, if necessary, a warning is issued. After inputting all parameters, the pipetting apparatus takes up the total volume after the actuation of the first kind of the operational control device and releases an individual volume after each actuation of the second kind of the operational control device. All other operations are executed preferentially like the normal dispensing.

Preferentially, one operating mode relates to the "sequential pipetting" (SeqP) of samples. Associated operating parameters are, each preferentially: the number of samples (preferentially up to a maximum number Nmax of preferentially 5<=Nmax<=15, preferentially Nmax=10); individual volumes of the individual samples; speed of the uptake; speed of the release. This function serves for the pipetting of a maximum Nmax of freely selectable volumes that are programmed before the start and that are immutable in their succession. The speed is preferentially the same for all samples in order to allow for a simple handling of this operation mode. The speed can also be set variably. The execution of the function corresponds to the execution of the pipetting. The previously entered volumes are processed in the programmed sequence. After the release, the actuation of a control element, e.g. by pressing a button, decides whether the next sample should be taken up or whether before the next sample is taken up a "blowout", i.e. a complete, safe blow-out of the sample still contained in the pipetting container by means of an overstroke, and/or whether the pipetting container should be changed.

Preferentially, one operating mode relates to the "reverse pipetting" (rPip) of samples. Associated operating parameters are, each preferentially: the volume of the individual sample; the speed of the uptake; the speed of the release; activation of the counters. For this function "rPip" more than the volume to be dosed is taken up. This is achieved by lowering the piston before the uptake of liquid, namely by an actuation of the second kind, i.e. e.g. by pressing a button or "rocker switch down", into the lower position of a blow-out, thus a overstroke of the piston which exceeds the position of the piston in a pipetting stroke. At the start of the uptake of volume the pipetting apparatus takes up the volume of the blow-out and the selected volume. In order to account for the backlash of the drive in release direction, the pipetting apparatus performs an additional stroke, which is immediately released again. This resembles the dispensing, but it occurs preferentially with an automated release of the disposal stroke with maximum speed.

During the execution of the operating mode "rPip", preferentially the following occurs: the piston of the pipetting apparatus moves automatically to the blow-out and remains in the lower position. Secondly, an actuation of the first kind of the operational control device occurs: the piston moves up by the blow-out distance and by the stroke of the pipetting volume. Thirdly, an actuation of the second kind of the operational control device occurs: the piston moves down by the stroke of the pipetting volume and stops before the blow-out. Fourthly, two actuations of the second kind of the operational control device occur: the piston performs the blow-out and remains in the lower position. Alternatively to "fourthly", an actuation of the first kind of the operational control device occurs: the piston moves up by the pipetting stroke. The mode "rPip" is suitable in particular for the pipetting of plasma, sera and other liquids with a high content of proteins. For aqueous solutions, in particular the mode "pipetting" is suitable. The mode "rPip" is suitable in particular for solutions containing surfactants, in order to minimize the foam formation during the release into the target container. The liquid is taken up in particular with an overstroke (blow-out volume). Here, the overstroke is generally not part of the release volume and is preferentially not released into the target container. In particular if the same sample is to be used again, the overstroke can remain in the pipette tip. If another liquid is used, the overstroke and/or preferentially the pipetting container is disposed of. A set of operating parameters preferentially controls a control program for the execution of the desired pipetting operation. The control program can in each case be provided in the form of electric circuits of the control device, and/or be provided by executable program code suitable for controlling a control device, which is controllable by program code and preferentially programmable.

The piston-stroke pipette or an external data processing device is preferentially designed to automatically check the parameter values entered by the user and to compare them with an allowed range of the corresponding operating parameter. If the parameter value entered by the user is outside of the allowed range, the input is either not accepted or set to a default value, which can be e.g. the minimum or maximum value or the last valid value entered.

The piston-stroke pipette and/or an external data processing device is preferentially powered network-independently. In particular the device can be equipped with a chargeable power supply, for example one or several batteries. For this case, the device can comprise a charging interface connected to the chargeable power supply.

Pipette tips are in particular disposal items and consist preferentially of plastic. Depending on the required maximum liquid volume, different pipette tips are used with the piston-stroke pipette. Typical nominal volumes of customary pipette tips are e.g. 10 μL, 20 μL, 100 μL, 200 μL, 300 μL, 1000 μL, 1250 μL, 2500 μL, 5 mL, 10 mL (μL: microliter; mL: milliliter). A pipette tip generally comprises a conical container elongated along a long axis comprising an opening for liquid exchange at the lower end and comprising at the upper end a conical or tubular end section opened upwards. The aspiration of the liquid into the pipette tip occurs due to a partial vacuum in the interior of the pipette tip. In the pipetting position, also termed clip-on position, in which the pipette tip—generally by clipping on—is connected with the connection section of the piston-stroke pipette, the interior of the pipette tip is connected fluidically with the pipetting channel of the piston-stroke pipette, which is pressurized with a partial vacuum/overpressure by means of a cylinder piston that can be moved electrically in the piston chamber shaped as a hollow cylinder.

The invention relates to a method, a hand-held piston-stroke pipette, a data processing device cooperating with that piston-stroke pipette, a system and a computer program. The possible and preferred embodiments of each of these items result from the description of all embodiments of the respective other items, in particular the possible embodiments of the hand-held piston-stroke pipette result from the description of the method, of the—in particular external—data processing device, of the system and of the computer program.

Further preferred embodiments of the method according to the present invention, the hand-held piston-stroke pipette, the data processing device cooperating with that piston-stroke pipette, the systems and the computer program result from the following description of the embodiment examples in connection with the figures and their description. Equal components of the embodiment examples are denoted essentially with equal reference numerals, unless otherwise described or otherwise indicated from the context. In the figures:

FIG. 1 schematically depicts in a perspective oblique view an embodiment example of a piston-stroke pipette according to the present invention.

Figure 2:
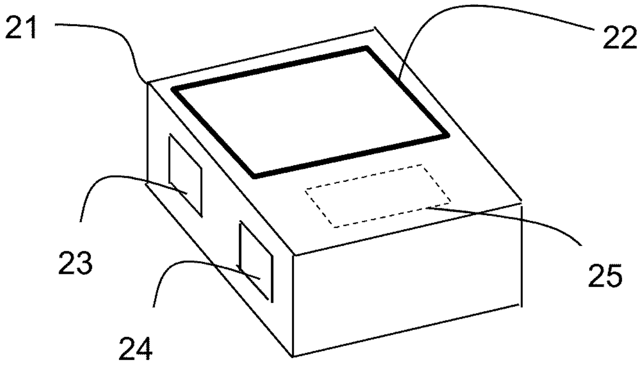

FIG. 2 schematically depicts in a perspective oblique view an embodiment example of an external data processing device that can be used for implementing the method according to the present invention.

Figure 3:
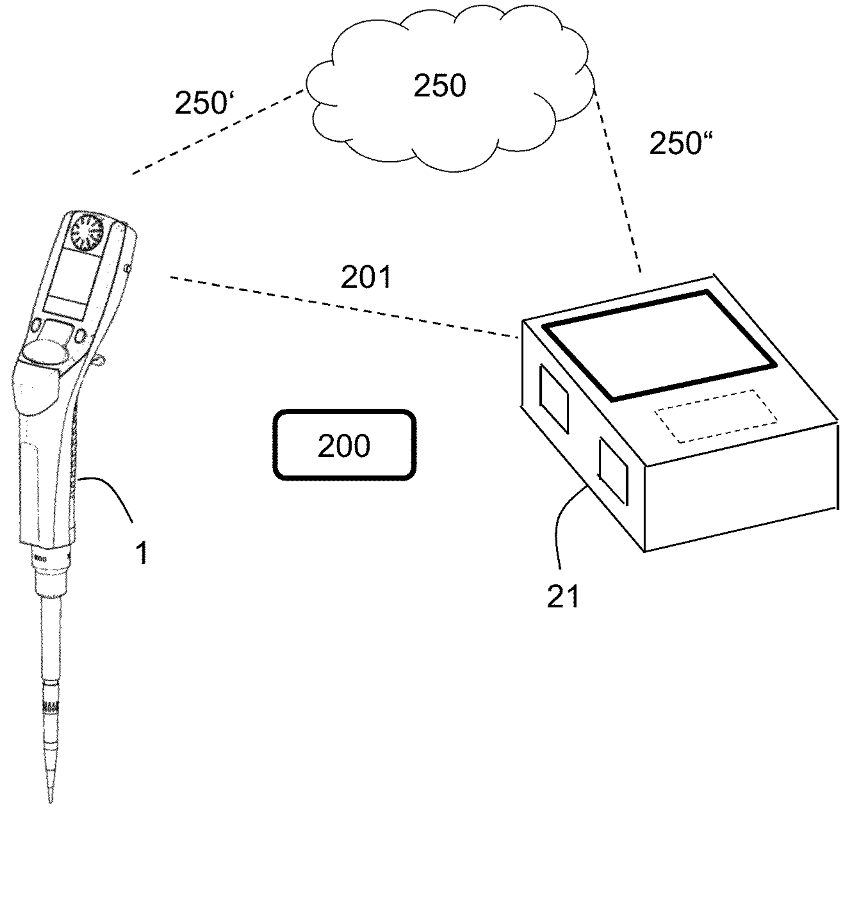

FIG. 3 schematically depicts in a perspective oblique view an embodiment example of a system that can be used for implementing the method according to the present invention.

Figure 4:
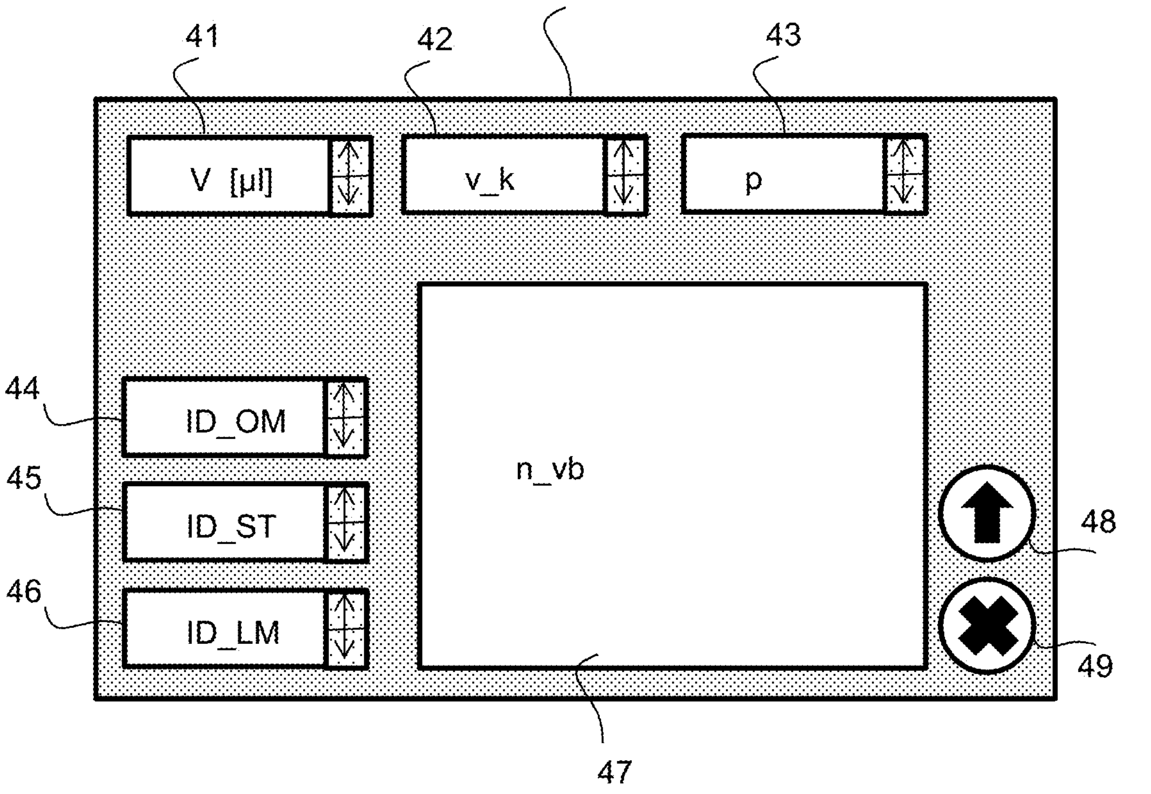

FIG. 4 depicts an example of the display page for acquiring the user parameters and for the output of information, which can be displayed in the display of the external processing device depicted in FIG. 2.

Figure 5:
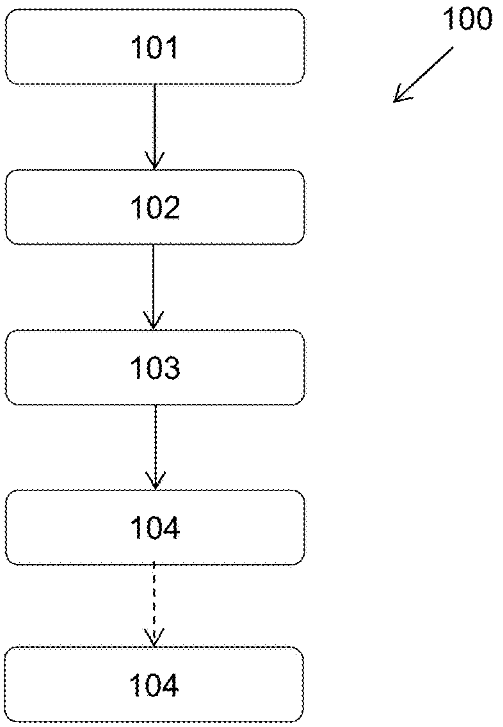

FIG. 5 schematically depicts the workflow of the method according to the present invention in an embodiment example.

Figure 6:
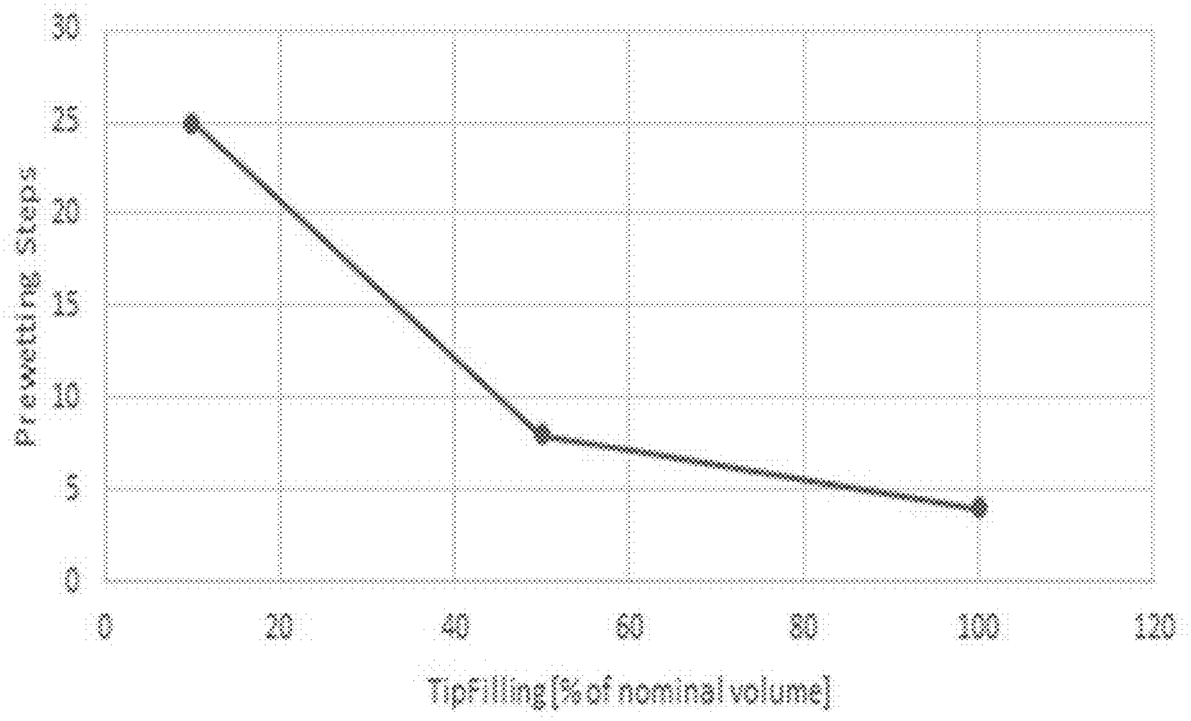

FIG. 6 depicts a diagram with the algorithmic representation of the number n_vb of prewetting step in function of the volume V, in which this function v_vb(V) can be used according to an embodiment example in the method according to the present invention.

FIG. 1 depicts the hand-held electric piston-stroke pipette 1 in a perspective view. With the pipette 1, the stroke of the piston is electrically driven. The activation of the stroke in the different operating modes of the pipette is electrically controlled by an electrical control device 17 with a connected storage device 18, inside the pipette 1. The control device 17 can comprise a radio module in order to exchange data with an external data processing device 2.1 (see FIG. 2).

The operating parameter and other setting of the pipette can be controlled by the user via the user interface device, resp. the operational control device and the display of the pipette. In the pipette, several electrically controlled pipetting programs are stored, in which a pipetting program is assigned preferentially to each operating mode. A pipetting program can be uniquely defined by a set of operating parameters. Once defined, the pipetting program can be triggered by the user and is started automatically by the pipette. The pipetting program comprises in particular that the method 100 according to the present invention for the prewetting of the pipette tip 10 is executed. If the relation parameter ID_LM< >0 is true at least one step for the prewetting is executed, if the relation parameter ID_LM=0 is true no step for the prewetting is executed. Instead of the value 0 also any other default value can be declared. The value ID_LM=0 could identify in particular water as main liquid component the sample to be pipetted.

The pipette 1 comprises a base body 2 which comprises a lower shaft section 3 and an upper section 4, which comprises in particular the display 5 and the control elements. The control section 3 extends parallel to the long axis A of the pipetting apparatus, whereas the upper section 4 is inclined to the axis A and extends parallel to the axis B. By the inclined arrangement of the upper section 4, it is possible to use the display in a very ergonomic way.

The pipette 1 comprises a handle section 7 with the holding flap 6 that rests on the index of the user when the pipette 1 is held by the user as intended, whereas the handle section 7 rests in the palm of the user. The thumb can reach in particular the eject button 8, which, when pressed down along the axis A, moves the spring-loaded ejection sleeve 9 downwards and ejects the pipette tip 10 from the nose cone 11 of the pipetting apparatus onto which it is clipped. The ejection mechanism can also be electronically driven. The pipette 1 comprises a metallic contact protrusion 19 on each side of the upper section 4, which serves for the charging of the integrated battery, which constitutes the energy storage of the electric pipette.

The operational control device (12; 13; 14*a*; 14*b*) comprises a dial 12, a rocker switch 13 and a first control button 14*a* and a second control button 14*b*.

The disk-like dial 12 is rotatably mounted on the base body 2, in particular parallel to the essentially flat front face of the upper section 4. A device recognizing the position of the dial 12 is provided that comprises in the present case a Hall sensor with which the relative position of the dial 12 is measured contactlessly with respect to the base body. The dial 12 comprises a number of detents that corresponds to the number of selectable positions of the dial. In particular, the detents are such that a mark 12*a* for designating the set position of the dial 12 can be aligned with the mark 15, which is fixed to the base body 2 on the front of the upper section 4.

The color display 5 serves as the central information element for the user. In particular, the various operating modes of the pipette 1 are displayed there and the parameter values of the operating parameter are displayed. In each of the two areas 5*a* and 5*b*, information is displayed that tells the user which function is associated to the first control button 14*a* resp. the second control button 14*b* on the currently displayed display page if a function is associated to it also on the respective display page. Every control button is thus designed as a control element with variable functionality and is termed as a "soft-key" in combination with the displayed function. This will be explained below.

Preferentially, the pipetting apparatus is designed to switch between the various functionalities of a soft-key if a certain operating mode of the pipette 1 is selected. This can be achieved, for example, by double clicking the soft-key or by holding the soft-key for a minimum amount of time, for example for 2 seconds.

Preferentially for every operating mode of the pipette 1, a display page that is displayed on the display is provided with the layout specific for the operating mode. Also for the definition of at least one prewetting step, a display page can be provided. If adjustable operating parameter or other mutable entries are provided on the display page, they can be marked using the control rocker switch 13 and, in particular, be selected with the control button 14*a*. In this case, the control button 14*a* has the functionality "selection" and the text "select" is shown in the display at the position 5*a*. Changing the parameter values of an operating parameter or changing the selection or an entry is achieved by the actuation of the rocker switch 13.

The rocker switch 13 is arranged on the base body so that it can pivot around an axis that is arranged perpendicularly to the long axis A. If the uses presses the upper range 13*a* a first function of the rocker switch 13 is activated, if the user presses the lower range 13*b* a second function of the rocker switch 13 is activated. The rocker switch is mounted such that no function is triggered if it is not presses. The rocker switch 13 serves, in particular in a manual operating mode of the pipette, for aspirating the sample to be pipetted into the pipette tip 10 while the user presses the upper range 13*a* and serves furthermore for releasing the sample from the pipette tip 10 while the user presses the lower range 13*b*.

The pipette 1 can be operated in different operating modes that have been explained above in detail. A first number of operating modes can be selected directly via the dial 12, a second number of operating modes can be selected with multiple selectable entries via a display page that is labeled as "special" resp. "Spc", in which each entry describes an operating mode. Via the dial, also an operating mode can be selected in which the at least one prewetting step is defined, in particular n_vb or x.

The pipette 1 comprises a storage device with a data storage, in which suitable storage ranges are provided for at least one operating parameter resp. parameter of the variable x and the value n_vb. In other embodiments of the pipette, the data storage can also comprise the complete function n_vb(x) or the data range relevant for the pipette regarding the respective parameter ID_GT.

FIG. 2 depicts the external data processing device 21 which is a portable, hand-held computer with a touchscreen 22, a network cable connector 23 for operating the computer 21 and a USB port 24. The electric control device 25 comprises a data processing device in order to execute a control program (operating system) that controls the functions of the computer 21, in particular the display of the content of the display e.g. the display page in FIG. 4, the data exchange with the pipette 1 via a radio module contained in the control device, a WLAN adapter. The control device 25 comprises a data storage, in which, in this case, the function n_vb(x) is stored. This function is formed by data assignment table consisting of data and data correlations and at least one data algorithm for interpolating or extrapolating further assignments n_vb(x) from known assignments n_vb (x). The determination of the content of the function n_vb(x) will be explained below in an example. The computer is configured to determine the parameters of the variable x from the user entries, to determine the assigned value n_vb from the parameter values of the variable x via the function n_vb(x), and to wirelessly transfer the value n_vb as well as other parameters x serving as operating parameter via the WLAN adapter to the pipette 1.

FIG. 3 depicts the system 200 that comprises the pipette 1 and the external data processing device 21, which exchange data via a radio connection 201, 250', 250" resp. via a network 250, in particular via WLAN.

FIG. 4 depicts a display page 40 to be displayed on the touchscreen display 22 of the portable computers 21, which is used as input device for entering parameters of the variable x resp. of operating parameters of the pipette 1:

Shown in it:

41 Output and input field for entering the parameter V

42 Output and input field for entering the parameter v_k

43 Output and input field for entering the parameter p regarding another property of a pipetting operation

44 Output and input field for entering the parameter ID_OM for the selection of the operating mode resp. the pipetting mode of the pipette

45 Output and input field for entering the parameter ID_ST regarding the type of pipette tip

46 Output and input field for entering the parameter ID_LM regarding the type of liquid of the sample used in the pipetting operation

47 Display area for displaying in particular the number n_vb determined in function of the other parameters x

48 Input field for starting the transfer of data, in particular n_vb, to the pipette 1, that has established a data connection with the computer 21

49 Input field for canceling the inputs

FIG. 5 depicts an embodiment example of the method 100 according to the present invention. The method 100 serves for the operation of a hand-held, computer-controlled piston-stroke pipette 1 which serves for the computer-controlled execution of a pipetting operation with a fluid sample, in particular for the automated prewetting of the inside of a pipette tip 10 arranged at the nose cone 11 of the piston-stroke pipette 1, comprising the computer-controlled steps:

Step 101: Providing a function n_vb(x) in the data storage of the external computer 21 that indicates the number n_vb of one or several prewetting steps n_vb in function of a variable x characterizing the pipetting operation.

Step 102: Acquiring the at least one parameter value (V; ID_LM) of the variable x characterizing the pipetting operation via the touchscreen 22, on which the user enters resp. selects these values;

Step 103: Determining the number n_vb of prewetting steps assigned to the variable x from the function n_vb(x) via the control device 25 of the external computer 21; the control device 25 comprises a WLAN adapter and, here, is configured to automatically find the WLAN adapters of suitable piston-stroke pipettes, in particular that of piston-stroke pipette 1, in reach of the radio connection, in particular to determine their identification parameter ID_GT, in particular to determine the correct value—or the values—n_vb in function of ID_GT and of the value of x (V, ID_LM) defined by the user via the function n_vb(x), in which it is considered that only those pipettes are taken in consideration that are suitable for pipetting the desired sample volume V, to establish data connection to those WLAN adapters found, and in particular to transfer the respective values n_vb, in particular also V and other parameters as described for example in FIG. 4, in dependence of ID_GT to each of the respective piston-stroke pipette ID_GT, in particular to the piston-stroke pipette 1. In this case, the computer 21 thus automatically transfers the desired parameters to all pipettes within reach without the user having to select the pipette separately when operating the computer 21. Preferentially, all operating parameters of the pipette 1 required for the desired pipetting operation are determined and transferred to the pipette, so that the user does not have to use the input device of pipette 1 in order to immediately start the pipetting operation plus the upstream prewetting steps.

Step 104: after the user has started the automated pipetting operation at the pipette 1 by pressing a button resp. entering: Execution of a sequence of a number n_vb of prewetting steps with the pipette 1 that has gathered this value and in particular also V from the computer 21 via WLAN, in which n_vb>0 and in which the prewetting step comprises that the piston-stroke pipette executes an electrically driven piston movement in order to take up a sample volume of the liquid with the ID_LM into the pipette tip and that subsequently an inverse piston movement is executed in order to release the sample volume contained in the pipette tip from the pipette tip completely. By using only the volume V (and not the entire nominal volume of the pipette resp. the pipette tip) for the aspiration during the prewetting steps, it is ensured that the appropriate amount of liquid is available. With the selection of V, the user defines that this amount is available.

Step 105: Aspiration of the volume V of the fluid sample (ID_LM) into the pipette tip 10 and holding of that amount of liquid V for an appropriate amount of time Δt in the pipette tip 10, in particular for the release of the sample into a target container, resp. for the stepwise release into several target container, resp. for the execution of the respectively desired pipetting operation.

FIG. 6 depicts an algorithmic function n_vb(V), in which the number n_vb of prewettings (here: "prewetting steps") is indicated in function of the desired volume V. The function comprises a first straight line section indicating the volume values V between 10% and 50% of the nominal volume V_nom of the respective pipette (ID_GT) for the respective liquid (ID_LM), and a second straight line section indicating the volume values V between 50% and 100% of the nominal volume V_nom of the respective pipette (ID_GT) for the respective liquid (ID_LM). In practice, this interpolation of values n_vb(V) has been proven suitable for determining also the values n_vb(V), which were not determined experimentally before, with sufficient accuracy. The algorithmic function n_vb(V) and other similar functions are a component of the function n_vb(x) resp. complement it.

Determination of the Function n_vb(x)

In order to determine the function n_vb(x), the following procedure is suitable.

To avoid a dripping of organic solvents from the pipette tip 10, the used pipette tip have been prewetted, partially multiple times. It turns out that the required number of prewetting steps (the prewetting time) of a pipette depends on various factors of the variable x:

vapor pressure of the liquid
volume of the air cushion of the used pipette
Percentage filling level of the pipette tip
speed of the prewetting steps 100%, 50% and 10% of the nominal volume were tested with each volume variant of the piston-stroke pipette Xplorer® plus, Eppendorf AG, Germany. The required number n_vb of prewetting steps was determined until the pipette did not show dripping behavior for Δt=30 seconds. The minimum number n_vb of prewetting steps was counted in order to calculate an algorithmic function that predicts how many steps are required for the pipetting of a certain volume and a certain liquid. Also, gravimetric tests were performed as a check.

Based on the determined data, linear functions could be assembled for all tested pipettes (filling level 10%-50% and 50%-100%), which describe the relation between the filling level FV_nom of the pipette tip and the number of prewetting steps n_vb. The resulting liquid classes can be used to pipette any kind of liquid with a vapor pressure higher than water and in particular a vapor pressure lower than 250 hPa using at least one prewetting step.

For the organic solvents ethanol, methanol and acetone, it was possible to determine the minimum number of prewetting steps n_vb for the tested variants of pipettes. Based on these data, the relation between the filling level of the pipette and the number of prewetting steps can be calculated. Three liquid in their pure form were chosen for the study:

| | vapor pressure [hPa] |
|---|---|
| ethanol | 58 |
| methanol | 129 |
| acetone | 246 |

These liquids were tested at 100%, 50% and 10% of the nominal volume with each volume variant of the pipette "Xplorer Plus".

In order to be able to pipette these liquids, a certain number of prewetting steps has to be executed, so that the liquid does not drip from the pipette tip for at least 30 seconds (Δt).

This minimum number of prewetting steps was counted in order to calculate a function n_vb(V) that predicts how many step are required for pipetting a certain volume V and a certain liquid.

The smaller the volume to be pipetted V resp. FV_nom is selected, the more prewetting steps have to be executed. Correspondingly, also the duration of the prewetting phase is extended.

For all pipettes with a nominal volume bigger than 100 μl, the dripping of the liquids could not be prevented for more than 30 seconds even after 99 prewetting step at a setting of 10% of the nominal volume.

Between the considered prewetting steps from 100% to 50% and from 50% to 10%, linear functions can be formed that determine the sufficient prewetting steps in these ranges in a reasonable approximation. From the following evaluation, the axis intercept and the slope of the functions can be referred for all volume variants. With these functions, the desired liquid classes can then be formed.

There does not appear to be a difference between single channel pipettes and the corresponding multi channel pipettes. For future test for the determination of the prewetting steps, presumably not all variants of a pipette need to be tested individually. Of different variants with the same air cushion, only one has to be tested.

The higher the speed setting is selected, the shorter is the prewetting time. For this reason, for all prewetting steps speed setting 8 is selected.

The experiments were executed with the Xplorer Plus® and with the volume variants mentioned in the evaluation. If more than one prewetting step was used, the mode "pipetting followed by mixing (P/Mix)" was employed. By this, the user-related time between the uptake and the release can be reduced. For fewer prewetting steps, the mode "pipetting" was employed.

In the tests, the time was measured until the first drop was released from the pipette tip. If this time was under Δt=30 seconds, the number of prewetting steps was increased until this value was reached (up to a maximum of 99 steps). All results of the series of tests are reported in the evaluation.

Procedure of the Execution

If several liquids were tested, the one with the lowest vapor pressure was tested first. By this, the testers could orientate themselves on the previous sample, regarding the prewetting steps. The results were entered in a table of the following type:

| Pipette | Volume fraction | Required prewetting-steps (steps) |
|---|---|---|
| Liquid/vapor pressure | 100% | |
| | 50% | |
| | 10% | |

Structure of the experimental procedure: A charger stand was placed in an elevated position, so that the pipette including the pipette tip could be hung over a beaker filled with the liquid. Furthermore, a stop watch was made available. The entire test was executed with the speed setting "8" executed. In the first run, liquid was taken up to the 100% of the nominal volume and it was checked without a prewetting step whether the pipette started to drip after 30 seconds. If that was not the case, the value "0" was entered. Otherwise, the prewetting steps were increased step by step until the of of 30 seconds was observed or until the maximum value of 99 prewetting steps was reached. The values were entered correspondingly. This approach was also applied correspondingly with 50% and subsequently with 10% of the nominal volume. At each first run, one could start with the number of prewetting steps of the previous volume fraction. After the prewetting, the pipette was placed on an elevated charger stand and the stop watch was started.

The linear functions can be determined as demonstrated in the following example of the 100 µl-pipette: Calculation of the axis intercept 100% to 50%; and 50% to 10%:

prewetting steps calculated: =slope ($a$)*desired volume (V)+axis intercept ($b$)

| 100 µl pipette | Volume fraction | Required Prewetting steps | Axis intercept b | Slope a | Selected volume V | Steps calculated |
|---|---|---|---|---|---|---|
| Ethanol | 100% | 1 | 3 | −0.02 | 100 | 1 |
| 58 hPa | 50% | 2 | | | | |
| | 10% | 4 | 4.5 | −0.05 | 10 | 4 |

The second linear function was determined correspondingly with the value of 50% to 10%. The calculated prewetting steps are reported as a check. Axis intercept and slope are the required values.

Results of the series of tests for the 10 µl pipette and the 100 µl Pipette of a pipette set in for of a data assignment table of the function n_vb(x):

| Pipette | | | | | | |
|---|---|---|---|---|---|---|
| | Volume Fraction % | Required Steps | Time | Speed | Speed Time at 100% | Multiplier |
| 10 µl | | | | | | |
| Ethanol | 100 | 0 | 0 | 8 | 1.8 | 1 |
| 58 hPa | 50 | 0 | 0 | 8 | 1.8 | 0.5 |
| | 10 | 0 | 0 | 8 | 1.8 | 0.1 |
| Aceton | 100 | 0 | 0 | 8 | 1.8 | 1 |
| 246 hPa | 50 | 0 | 0 | 8 | 1.8 | 0.5 |
| | 10 | 0 | 0 | 8 | 1.8 | 0.1 |
| Methanol | 100 | 0 | 0 | 8 | 1.8 | 1 |
| 129 hPa | 50 | 0 | 0 | 8 | 1.8 | 0.5 |
| | 10 | 0 | 0 | 8 | 1.8 | 0.1 |
| 100 µl | | | | | | |
| Ethanol | 100 | 1 | 1.8 | 8 | 1.8 | 1 |
| 58 hPa | 50 | 2 | 1.8 | 8 | 1.8 | 0.5 |
| | 10 | 4 | 0.72 | 8 | 1.8 | 0.1 |
| Aceton | 100 | 2 | 3.6 | 8 | 1.8 | 1 |
| 246 hPa | 50 | 14 | 12.6 | 8 | 1.8 | 0.5 |
| | 10 | 20 | 3.6 | 8 | 1.8 | 0.1 |
| Methanol | 100 | 2 | 3.6 | 8 | 1.8 | 1 |
| 129 hPa | 50 | 9 | 8.1 | 8 | 1.8 | 0.5 |
| | 10 | 70 | 12.6 | 8 | 1.8 | 0.1 |

| Axis intercept + slope * desired volume = calculated steps | | | | | |
|---|---|---|---|---|---|
| Axis Intercept | Slope | Desired Volume | Steps Calculated | Volume Fraction | Time |
| 0 | 0 | 100 | 0 | 1 | 0.0 |
| 0 | 0 | 10 | 0 | 0.1 | 0 |
| 0 | 0 | 100 | 0 | 1 | 0.0 |
| 0 | 0 | 10 | 0 | 0.1 | 0 |
| 0 | 0 | 100 | 0 | 1 | 0.0 |
| 0 | 0 | 10 | 0 | 0.1 | 0 |
| 3 | −0.02 | 100 | 1 | 1 | 1.8 |
| 4.5 | −0.05 | 10 | 4 | 0.1 | 0.72 |
| 26 | −0.24 | 100 | 2 | 1 | 3.6 |
| 21.5 | −0.15 | 10 | 20 | 0.1 | 3.6 |
| 16 | −0.14 | 100 | 2 | 1 | 3.6 |
| 85.25 | −1.525 | 10 | 70 | 0.1 | 12.6 |

The invention claimed is:

1. Method (100) for operating a hand-held, computer-controlled piston-stroke pipette (1) used for the computer-controlled execution of a pipetting operation with a fluid sample and for the automatic prewetting of the inside of a pipette tip (10), arranged at the nose cone (11) of the piston-stroke pipette, comprising the computer-controlled steps, which are performed in the following order Providing a function nvb(x) specifying a nvb of one or more prewetting steps as a function of a variable x characterizing the pipetting operation, (101) the function nvb(x) comprising a data assignment table for assigning the number nvb to the variable x, wherein the variable x contains at least one of the parameter values of the following parameters or is formed by it or by parameters that can be determined from the parameters selected from the group consisting of: a parameter ID_LM chemically identifying the main liquid component of a fluid sample to be pipetted, a parameter ID_VM identifying a diluent contained in a fluid sample to be pipetted, a parameter ID_GT identifying the type of device of the piston-stroke pipette executing the pipetting operation, a parameter V_nom identifying the type of device of the piston-stroke pipette executing the pipetting operation by its nominal volume, a parameter ID_ST identifying the type of pipette tip of the pipette tip used in the pipetting operation, a speed v_K of a piston-stroke of the piston-stroke pipette executing during the pipetting operation or during at least one prewetting step, a temperature T of the surrounding of the piston-stroke pipette or the fluid sample to be pipetted in the pipetting operation at a time of the pipetting operation, an air pressure or a vapor pressure P of the surrounding of the piston-stroke pipette at a time of the pipetting operation;

Acquiring of the at least one parameter value of the variable x characterizing the pipetting operation; (102)

Determining the number nvb of prewetting step associated to the variable x by means of the function nvb(x); (103)

Executing a sequence of the number nvb of prewetting steps, (104)

in which nvb>0 and in which the prewetting step in each case comprises that the piston-stroke pipette executes an electrically driven piston movement in order to take up a sample volume into the pipette tip and that subsequently an inverse piston movement is executed in order to release the sample volume contained in the pipette tip from the pipette tip at least partially or completely.

2. Method according to claim 1, wherein the variable x contains the parameter value V of the volume of the pipetting volume V to be aspirated into the pipette tip in the pipetting operation or is formed by this parameter value V.

3. Method according to claim 1, wherein the function nvb(x) comprises at least one calculation algorithm in order to assign the number nvb to the variable x.

4. Method according to claim 1, wherein the function nvb(x) optimizes a number nvb of one or several prewetting steps as a function of a variable x characterizing the pipetting operation such that the air pressure in the air cushion between the fluid sample and the motionless piston of the piston-stroke pipette achieved by means of the prewettings is sufficiently constant for avoiding the dripping of the sample aspirated into the pipette tip in the pipetting operation.

5. Method according to claim 1, wherein the variable x contains the parameter value V of the volume of the pipetting volume V to be aspirated into the pipetting tip in the pipetting operation or is formed by this parameter value V, and wherein the function nvb(V) is described as a linear relation between nvb and V, thus nvb=a*V+b, with a and b being real numbers, wherein the range of the volumes V that can be pipetted is preferentially divided in two section, in each of which a characteristic set of parameters a, b is valid, so that the relation nvb=a1V+b1 is valid in the range V1 to V2 of the possible volumes and the relation nvb=a2*V+b2 is valid in the range V2 to V3 of the possible volumes, and a1*< >a2 and b1< >b2** are valid.

6. Method for executing a computer-controlled pipetting operation by means of a hand-held computer-controlled piston-stroke pipette, comprising the method according to claim 1, and comprising the step to automatically execute the following computer-controlled step subsequent to the execution of the sequence of the number n of one or more prewetting steps: Aspirating a sample volume V of the fluid sample into the pipette tip and, holding that sample volume V of the fluid sample in the pipette tip (205).

7. Method according to claim 1, wherein an external data processing device is provided, which comprises a user interface device and an electronic control device, and wherein the piston-stroke pipette is provided or several piston-stroke pipettes are provided, wherein each piston-stroke pipette comprises an electronic control device, wherein the control devices of the external data processing device and of the piston-stroke pipette are configured to exchange data among each other via a data connection, wherein the control device of the external data processing device is configured to acquire at least one or all of the said parameters of the variable x by means of the user interface device.

8. Method according to claim 7, wherein the control device of the external data processing device is configured to determine by means of the function nvb(x) the value of the number nvb of prewetting steps from at least one or all of the said parameters of the variable x.

9. Method according to claim 7, wherein the external data processing device and/or the at least one piston-stroke pipette comprises a non-transitory data storage medium, in which the function nvb(x) is stored and/or the value nvb can be stored.

10. Method according to claim 9, wherein the control device of the at least one piston-stroke pipette acquires the value nvb via the data connection and stores it in a non-transitory data storage medium of the piston-stroke pipette.

11. System (200) for the automated prewetting of the inside of a pipette tip arranged at the nose cone of a hand-held, computer-controlled piston-stroke pipette that serves for the computer-controlled execution of a pipetting operation with a fluid sample, comprising a hand-held piston-stroke pipette (1) for the computer-controlled execution of a pipetting operation with a fluid sample, comprising an electronic control device, a piston chamber and a piston that can move therein, an electric piston drive for moving the piston, a nose cone, to which a pipette tip can be attached, wherein the electronic control device is configured to control the piston drive and to execute a pipetting program comprising the following steps execution of a sequence of a number nvb of one or several prewetting steps, wherein each prewetting step comprises that an electrically driven piston-stroke is executed by the piston-stroke pipette in order to take up a sample volume into the pipette tip and that subsequently an inverse piston-stroke is executed in order to release the sample volume at least partially or completely from the pipette tip, subsequent to the at least one prewetting step executing a pipetting operation comprising the aspiration of a sample volume V of the fluid sample into the pipette tip and holding of that sample volume V of the fluid sample in the pipette tip;

an external data processing device (21) comprising a data interface device and an electronic control device, wherein the control devices of the external data processing device and of the piston-stroke pipette are configured to exchange data with each other via a data connection, wherein the control device of the external data processing device is configured to acquire a variable x by means of the data interface device, and the system is configured to determine by means of the function nvb(x) the value of the number nvb of prewetting steps from at least one or all of the said parameters of the variable x, wherein the electronic control device is configured to execute the following steps utilizing a function nvb (x) specifying a number nvb of one or more prewetting steps as a function of a variable x characterizing the pipetting operation, (101);

the function nvb(x) comprising a data assignment table for assigning the number nvb to the variable x, wherein the variable x contains at least one of the parameter values of the following parameters or is formed by it or by parameters that can be determined from the parameters listed in the following: a parameter ID_LM chemically identifying the main liquid component of the fluid sample to be pipetted, a parameter ID_VM identifying a diluent contained in the fluid sample to be pipetted, a parameter ID_GT identifying the type of device of the piston-stroke pipetted executing the pipetting operation, a parameter V_nom identifying the type of device of the piston-stroke pipette executing the pipetting operation by its nominal volume, a parameter ID_ST identifying the type of pipette tip of the pipette tip used in the pipetting operation, a speed v_K of the piston-stroke of the piston-stroke pipette executed during this pipetting operation or during at least one prewetting step, a temperature T of the surroundings of the piston-stroke pipette or the fluid sample to be pipetted in the pipetting operation at the time of pipetting operation, an air pressure or a vapor pressure P of the surroundings of the piston-stroke pipette at the time of the pipetting operation;

acquiring the at least one parameter value of the variable x characterizing the pipetting operation; (102) determining the number nvb of prewetting step associated to the variable x by means of the function nvb(x); (103);

wherein the control device of the at least one piston-stroke pipette is configured to acquire the number nvb of prewetting steps via the data connection.

12. Computer program for operating a hand-held, computer-controlled piston-stroke pipette, that serves for the computer-controlled execution of a pipetting operation with the fluid sample and for the automated prewetting of the inside of a pipette tip that is arranged at the nose cone of the piston-stroke pipette, wherein the computer program comprises commands which, when the computer program is executed by the central processing unit of at least one electrical control device, causing the central processing unit to execute the following steps Acquiring of the at least one parameter value of the variable x characterizing the pipetting operation;

Accessing a non-transitory data storage medium in which a function nvb(x) is stored that indicates a number nvb of one or more prewetting steps as a function of a variable x characterizing the pipetting operation, Determining the number nvb of prewetting step associated to the variable x by means of the function nvb(x);

Providing at least the value nvb to the data processing of the control device of the piston-stroke pipette and transferring at least the value nvb to the control device of the piston-stroke pipette.

13. Data processing device comprising a data interface device, and an electronic control device, wherein the control device of the data processing device is configured to exchange, via a data connection, data with the control device of a hand-held piston-stroke pipette, which serves for the computer-controlled execution of a pipetting operation with a fluid sample, wherein the electronic control device of the data processing device is configured to acquire at least one parameter of a variable x by means of the data interface device, and wherein the electronic control device of the data processing device is configured to determine the value of the number nvb of the prewetting steps from the at least one or all of the said parameters of the variable x by executing the following steps in order utilizing a function nvb(x) specifying a number nvb of one or more prewetting steps as a function of a variable x characterizing the pipetting operation, (101);

the function nvb(x) comprising a data assignment table for assigning the number nvb to the variable x, wherein the variable x contains at least one of the parameter values of the following parameters or is formed by it or by parameters that can be determined from the parameters listed in the following: a parameter ID_LM chemically identifying the main liquid component of the fluid sample to be pipetted, a parameter ID_VM identifying a diluent contained in the fluid sample to be pipetted, a parameter ID_GT identifying the type of device of the piston-stroke pipetted executing the pipetting operation, a parameter V_nom identifying the type of device of the piston-stroke pipette executing the pipetting operation by its nominal volume, a parameter ID_ST identifying the type of pipette tip of the pipette tip used in the pipetting operation, a speed v_K of the piston-stroke of the piston-stroke pipette executed during this pipetting operation or during at least one prewetting step, a temperature T of the surroundings of the piston-stroke pipette or the fluid sample to be pipetted in the pipetting operation at the time of pipetting operation, an air pressure or a vapor pressure P of the surroundings of the piston-stroke pipette at the time of the pipetting operation;

acquiring the at least one parameter value of the variable x characterizing the pipetting operation; (102)

determining the number nvb of prewetting step associated to the variable x by means of the function nvb(x); (103); and wherein the electronic control device of the data processing device is configured to provide it to the data processing of the electronic control device of the piston-stroke pipette and/or to transfer it to the piston-stroke pipette via the data connection.

* * * * *